May 16, 1950      C. W. BERTHIEZ      2,507,555
MECHANICAL TRANSMISSION SYSTEM
Filed May 4, 1945      2 Sheets-Sheet 1
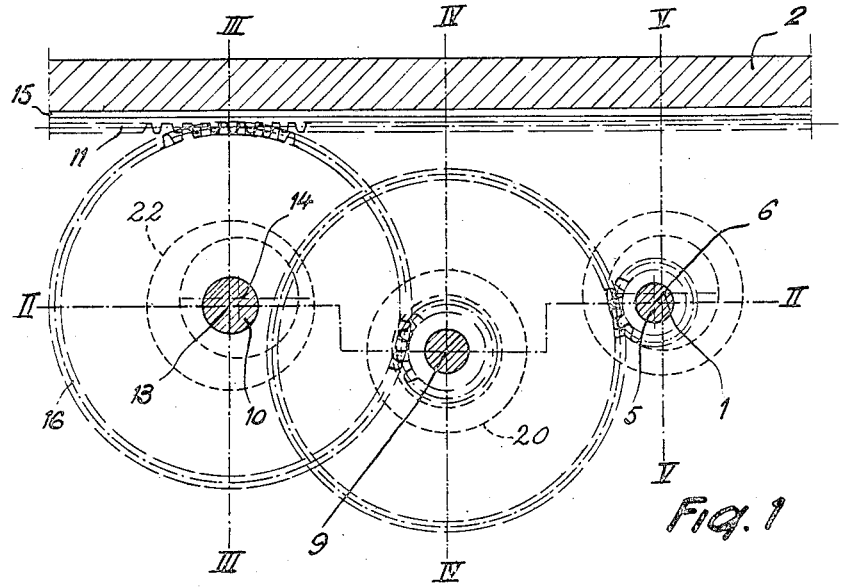
Fig. 1
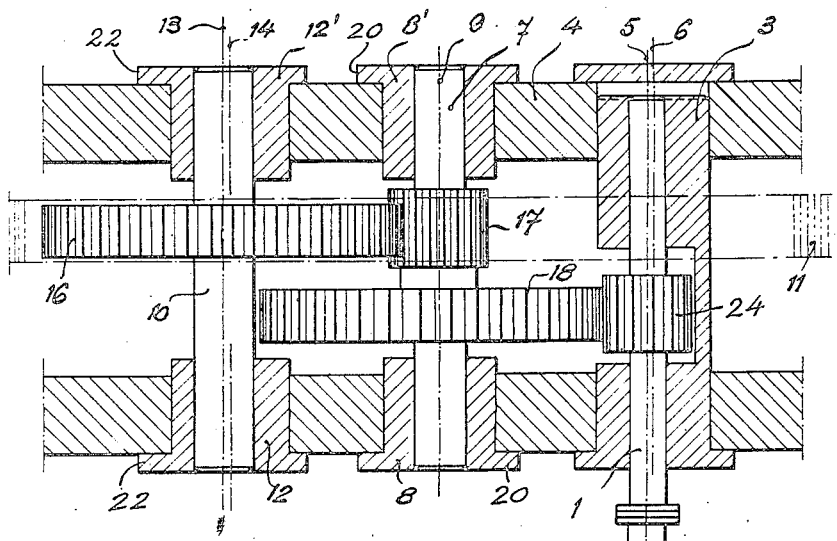
Fig. 2
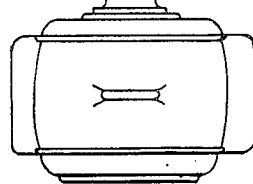
Charles William Berthiez
INVENTOR
By George H. Corey
His Attorney

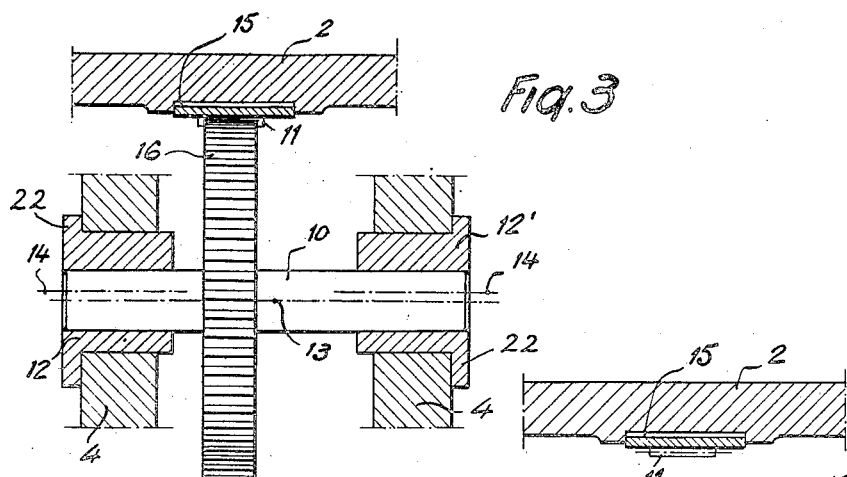
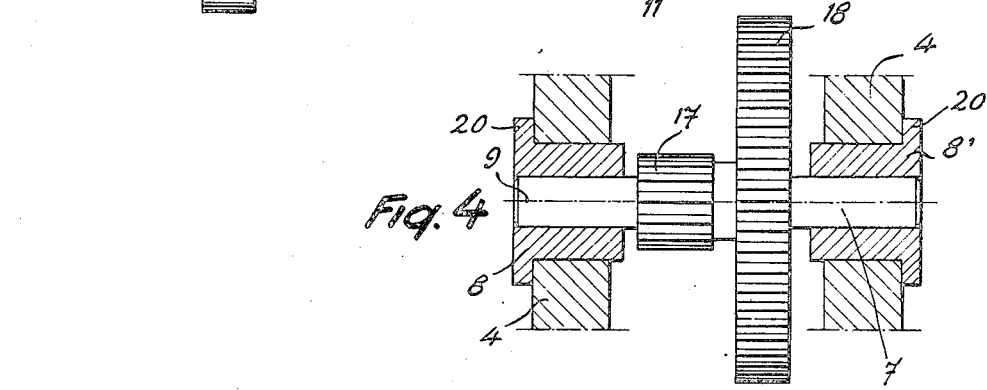
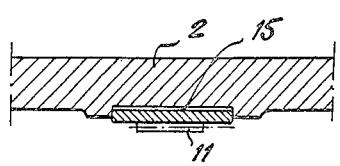
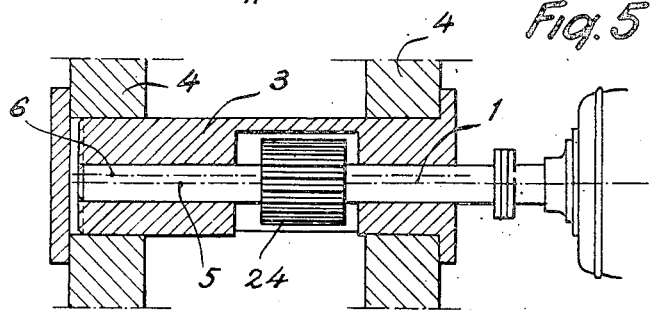

Patented May 16, 1950

2,507,555

UNITED STATES PATENT OFFICE 2,507,555

MECHANICAL TRANSMISSION SYSTEM

Charles William Berthiez, Paris, France

Application May 4, 1945, Serial No. 592,014
In France September 22, 1941

Section 1, Public Law 690, August 8, 1946
Patent expires September 22, 1961

6 Claims. (Cl. 74—397)

In order to obtain a highly accurate machining and a finish as perfect as possible of the work pieces machined on machine-tools, such as planing machines including a table which is given a reciprocating motion, it is customary to machine the parts which drive and transmit power to the table with the highest possible accuracy in accordance with their theoretical dimensions in order to eliminate, as far as possible, play between said driving parts.

But despite all the care that may be brought to the manufacture of these parts, the fact remains that every workman will have an appreciation of the requisite accuracy of manufacture according to his personal coefficient, which necessarily leads to small variable differences in the dimensions of the parts and consequently to certain differences which vary in the relative positions of the driving and transmission parts, which are difficult to assemble together. In any case, these differences with respect to the true dimension unavoidably produce a certain play between the parts of the machine drive and transmission.

In modern machine-tools which work at high speed and in which it is endeavoured to reduce to a minimum the time losses in order to increase the efficiency and output of said machines, any play, however small it may be, in the driving and transmission mechanism of the machine, involves very serious drawbacks. When the direction of movement of the table is reversed, there is produced a shock which is of more or less effect according to the speed of the table. This shock is transmitted to the whole mechanism. The constant hammering which results from these shocks destroys the correct profile of the teeth of gears which may be used, so that the parts are no longer driven with a uniform movement. The play therefore increases, the shocks become more and more violent and as they increase in intensity the damage becomes greater and greater, to the detriment of the correct operation of the machine and of the finish of the machine pieces turned out by said machined work.

In order to overcome these difficulties, it becomes necessary, in order to protect the machine, either to reduce the speed of movement of the table so as to reduce the damaging effect above referred to, or to stop the cutting at the end of each stroke of the table in order to prevent the shock which occurs at this time in the transmission as a consequence of the play therein from being imparted to the work piece. In the first case, the machine operates less rapidly; in the second case, the time losses are increased. In any case, the efficiency and output of the machine are reduced.

The object of the present invention is to obviate the drawbacks above set forth, and, in particular, to provide a device for eliminating play in the driving transmission of the table of a machine tool such as a planing machine or any other reciprocating motion machine.

According to an essential feature of the present invention, in a transmission mechanism for a machine-tool such as a planing machine, or other reciprocating motion machine, the shafts are mounted in sockets or sleeves one, two or more of which are adjustable by rotation in their support (bed or frame, for instance), the shafts being eccentrically journaled in these sockets or sleeves so that their axes can be moved toward or away from one another in such manner as to eliminate any play in the transmission.

Other features of the present invention will result from the following detailed description of some specific embodiments thereof.

A preferred embodiment of the present invention will be hereinafter described with reference to the accompanying drawings, given merely by way of example, and in which:

Figure 1 is a diagrammatic elevational view, partly in section, of the transmission for driving the table of a machine-tool, such as a planing machine;

Figure 2 is a horizontnal section on the line II—II of Figure 1;

Figures 3, 4 and 5 are vertical sections on the lines III—III, IV—IV, and V—V, respectively, of Figure 1.

As shown by the drawing, the driving shaft 1 of the transmission intended to drive the table 2 of a machine-tool, such as a planing machine, is mounted in a socket 3 which extends over the whole width of the bed 4 of the machine, in order to ensure perfect rigidity and positioning of said shaft 1. According to the invention, this socket 3 is rotatable in bed 4 so as to permit adjustment of the position of shaft 1 due to the fact that the shaft 1 is eccentrically mounted in the socket 3 and that the latter can rotate about its axis in bed 4. In other words, the axis 5 of shaft 1 and the axis 6 of socket or sleeve 3 are parallel but do not coincide with each other, as shown by Figures 1, 2 and 5.

Considering now the intermediate shaft 7 which carries the wheel 18 which meshes with the driving pinion 24 on shaft 1, this shaft 7 is mounted in two sleeves or sockets 8 and 8'. These sockets, in the example shown by the drawing, are not eccentric with respect to shaft 7. In other words, these sockets 8, 8' and this shaft 7 have the same axis 9 (see Figures 1, 2 and 4). The external flanges 20 of these sockets are made very exactly of the same diameter and are concentric with the sockets and shaft for purposes hereinafter set forth.

The shaft 10 which carries the toothed wheel 16 which meshes with the rack 11 of the table is also mounted in two sockets or sleeves 12 and 12' adjustable eccentrically with respect to bed 4, that is to say rotatable in said bed about their common axis 14. As shown by Figures 1, 2 and 3, the axis 13 of shaft 10 and the common axis 14 of sockets 12 and 12' are parallel but do not coincide with each other. The external flanges 22 of these sockets have the same axis 13 as shaft 10 and are made very exactly of the same diameter.

Finally, as shown by Figures 1 and 3, I provide, between rack 11 and bottom of the groove in which said rack is mounted on the under side of table 2 a plurality of packing pieces 15 which permit of varying the height of said rack 11 with respect to the table, that is to say, of adjusting the meshing of wheel 16 carried by shaft 10 with rack 11.

In order to adjust the transmission above described so as to avoid any play, I may proceed in the following manner:

Shaft 7 being in position together with the wheel 18 and the pinion 17 which it carries, sockets 3, 12 and 12' are rotated in bed 4 in the proper direction for eliminating the play which may exist in the state of assembly of the parts.

The same operation will be repeated if, after a certain time, it is found that wear and tear of the teeth has produced a certain play in the transmission.

Parallelism of shafts 7 and 10 can be verified, for instance by means of a micrometric gauge placed between the circumferential surfaces of the flange 20 of socket 8 and the outside of flange 22 on socket 12 on one side of the bed, then between the circumferential surfaces of the flanges 20 and 22 of sockets 8' and 12' on the other face of the bed. Alternately, it is possible, the wheels having been removed after adjustment, to verify, through an optical device, whether the bores are in line.

The device above described, as illustrated by the drawing, has been given merely by way of example. Modifications might be made thereof while remaining within the scope of the invention.

For instance, sockets 8 and 8', which in the example shown, are coaxial with shaft 7, might be mounted eccentrically in the same manner as the sockets of the other shafts although this arrangement slightly complicates the adjustment of the device. But such an arrangement would permit at the same time of eliminating, without having recourse to packing pieces such as 15, any play between rack 11 and toothed wheel 16. In this case the adjustment would take place in the following manner. Sockets 12 and 12' are operated in such manner as to eliminate play between rack 11 and wheel 16; then sockets 8 and 8' are operated so as to eliminate play between wheel 16 and pinion 17, which is carried by shaft 7. Finally, sleeve 3 is operated so as to eliminate play between wheel 18, carried by shaft 7, and the driving pinion 24 carried by shaft 1.

Also, according to another modification, one, two, or more, of the sockets or pairs of sockets which carry the shafts of the transmission may have their positions adjusted by systems of slideways instead of being adjusted by an eccentric mounting. Moreover, a given transmission might include sockets mounted according to one system and sockets mounted according to the other.

Finally, although the arrangement according to which there is a single sleeve or socket for one shaft has been shown as applied only to the driving shaft 1, this arrangement might also be applied to other shafts. Conversely, for instance in the case of machines of lower power in which the stress on the driving shaft is not so great, the arrangement according to which two sockets cooperate to support the same shaft might be applied to the driving shaft. However, the arrangement illustrated by the drawing seems to give the maximum of advantages in the usual cases.

Of course, all kinds of ball bearings, roller bearings, etc., or the like, might be interposed between the shafts and their sleeves or sockets.

Furthermore, it is clear that the invention applies to any transmission for the drive of the table of a machine-tool other than that shown by the drawing. In particular, the number of shafts of the transmission may be different, being either smaller or greater. Also the transmission might be of the screw and rack type. The invention can advantageously be utilized in all cases where it is desired to transmit a movement to a part which is to be given a reciprocating movement.

In a general manner, while I have, in the above description, disclosed what I deem to be practical and efficient embodiments of the present invention, it should be well understood that I do not wish to be limited thereto as changes may be made in the arrangement, disposition and form of the parts without departing from the principle of the present invention as comprehended within the scope of the appended claims.

What I claim is:

1. A mechanical transmission system which comprises, in combination, a frame including two parallel vertical elements, three parallel shafts mounted in said frame at right angles to said vertical elements, a cylindrical sleeve rotatably mounted at its ends respectively in said vertical elements and forming a bearing for the first shaft, the axis of said sleeve being parallel and eccentric to the axis of the first shaft, two cylindrical sockets mounted respectitvely in said vertical elements and having concentric cylindrical bores with their axes in line with each other forming bearings for the second shaft, two cylindrical sockets rotatably fitted respectively in said vertical elements in line with each other and forming bearings for the third shaft, the common axis of said last mentioned sockets being parallel and eccentric to the axis of said third shaft, a toothed wheel mounted on each of the first and third shafts, two toothed wheels keyed on the second shaft and adapted to mesh respectively with the two first mentioned toothed wheels; the rotatable mounting of the sleeve and the two last mentioned sockets permitting adjustment of the positions of the first and third shafts with respect to the second shaft so as to fix the respective toothed wheels in proper meshing engagement with one another without play, and circular flanges on said sockets substantially in the same plane and having exterior cylindrical surfaces concentric with their respective shafts.

2. A mechanical transmission system which comprises, in combination, a frame including two parallel vertical elements, three parallel shafts mounted in said frame, a cylindrical sleeve rotatably mounted at its ends respectively in said vertical elements and forming a bearing for the first shaft, the axis of said sleeve being parallel and eccentric to the axis of said first shaft, two cylindical sockets mounted respectively in said vertical elements and having concentric cylindrical bores with their axes in line with each other and forming bearings for the second shaft in coaxial relation therewith, two cylindical sockets rotatably fitted respectively in said vertical elements in line with each other and forming bearings for the third shaft, the common axis of said two last mentioned sockets being parallel and eccentric to the axis of said third shaft, a toothed wheel mounted on each of the first and third shafts, two toothed wheels keyed on the second shaft and adapted to mesh respectively with the two first mentioned toothed wheels, a table carried by said frame, and a rack adjustably mounted in said table adapted to mesh with the toothed wheel mounted on the third shaft, the rotatable mounting of the sleeve and the two last mentioned sockets permitting adjustment of the first and third shafts with respect to the second shaft so as to fix the respective toothed wheels in proper meshing engagement with one another without play, said sockets of said second and third shafts being formed with flanges substantially in the same plane and providing cylindrical surfaces exterior to the respective vertical shaft supporting elements of said frame concentric with the respective shafts.

3. A mechanical transmission system which comprises in combination, a frame including two parallelly arranged supporting elements, three parallel shafts mounted in said frame with their axes transverse to said supporting elements, a cylindrical sleeve rotatably mounted at its ends respectively in said supporting elements and forming a bearing for the first shaft, the axis of said sleeve being parallel to and eccentric to the axis of the first shaft, two sockets mounted respectively in said supporting elements and providing cylindrical bores with their axes in line with each other and forming bearings for the second shaft in which said second shaft is supported with its axis fixed with respect to said supporting elements, two cylindrical sockets respectively rotatably mounted in said supporting elements in line with each other and forming bearings for the third shaft, the common axis of the two last mentioned sockets being parallel to and eccentric to the axis of said third shaft, a toothed wheel mounted on each of the third and first shafts, two toothed wheels keyed on the second shaft and adapted to mesh respectively with the two first mentioned toothed wheels, the rotatable mounting of the sleeve and the two last mentioned sockets permitting adjustment of the positions of the first and third shafts with respect to the second shaft, so as to position the respective toothed wheels in proper meshing engagement with one another without play, the bearings of said second shaft and at least one of the other shafts being formed with cylindrical surfaces exterior to the respective supporting elements and concentric with the respective shafts.

4. In a power transmission device the combination with reduction gearing comprising a shaft, a pinion fastened on said shaft, a second shaft in parallel relation to said first shaft, a gear fastened on said second shaft and meshing with said pinion on said first shaft, of a supporting frame, a bearing for said first shaft mounted in said frame and provided with a portion extending beyond said frame having an exterior cylindrical surface concentric with the shaft bearing surface of said shaft bearing, a bearing for said second shaft mounted in said frame and provided with a portion extending beyond said frame having a cylindrical surface concentric with the shaft bearing surface of said second shaft bearing, said second shaft bearing being provided with a cylindrical surface rotatably fitting in a cylindrical bore in said frame and having its axis eccentric to and parallel to the axis of said second shaft bearing surface and parallel to the axis of said first shaft bearing surface, whereby upon rotation of said second shaft bearing in said frame the axis of said second shaft bearing is moved toward or away from the axis of said first shaft bearing in parallel relation thereto and the distance between said exterior cylindrical surfaces of said bearings which are concentric respectively with the shaft bearing surfaces thereof is a measure of the distance between the axes of said two bearings.

5. In a power transmission device the combination with double reduction gearing comprising a driving shaft, a pinion fastened on said driving shaft, an intermediate shaft, a gear fastened on said intermediate shaft and meshing with said pinion on said driving shaft, a pinion fastened on said intermediate shaft, a driven shaft, a gear fastened on said driven shaft and meshing with said pinion on said intermediate shaft, of a supporting frame, a bearing for said intermediate shaft mounted in said frame to maintain the axis of said shaft in fixed relation to said frame and provided with a portion extending beyond said frame having an exterior cylindrical surface concentric with the shaft bearing surface of said intermediate shaft bearing, a bearing for said driven shaft mounted in said frame and provided with a portion extending beyond said frame having an exterior cylindrical surface concentric with the shaft bearing surface of said driven shaft bearing, said driven shaft bearing being provided with a second exterior cylindrical surface rotatably fitting in a cylindrical bore in said frame and having its axis eccentric to and parallel to the axis of said driven shaft bearing surface and parallel to the axis of said intermediate shaft bearing surface, a bearing for said driving shaft mounted in said frame and provided with an exterior cylindrical surface rotatably fitting in a cylindrical bore in said frame and having its axis eccentric to and parallel to the axis of said driving shaft bearing surface and parallel to the axis of said intermediate shaft bearing surface, whereby upon rotation of said driven shaft bearing and said driving shaft bearing in said frame the axes respectively of said driven shaft bearing and said driving shaft bearing are moved toward or away from the axis of said intermediate shaft bearing in parallel relation thereto, the distance between said exterior cylindrical surface of said intermediate shaft bearing and the first mentioned exterior cylindrical surface of said driven shaft bearing being a measure of the distance between the axes of said driven shaft bearing and said intermediate shaft bearing.

6. A mechanical transmission system for a machine tool or the like which comprises in combination a frame, three parallel shafts supported in said frame in spaced relation to each other, a cylindrical bearing member supported by said frame and forming a bearing for the intermediate shaft of said three parallel shafts to fix the axis of said intermediate shaft with respect to said frame, the other two shafts respectively being supported in bearing members provided with cylindrical surfaces rotatably mounted in cylindrical bores in said frame with the axes of the shafts respectively eccentric to the axes of said cylindrical bores, said axes of said cylindrical bores being parallel to each other and to the axis of said intermediate shaft, a toothed wheel fastened on each of said two other parallel shafts, and two toothed wheels fastened on said intermediate shaft and adapted to mesh respectively with said two first mentioned toothed wheels, whereby said two other parallel shafts may be adjusted with respect to said intermediate shaft upon rotation of said cylindrical bearing members of said two other parallel shafts in the respective bores in said frame to position the respective toothed wheels in proper engagement with each other.

CHARLES WILLIAM BERTHIEZ.

REFERENCES CITED

The following references are of record in the file of this patent:

UNITED STATES PATENTS

| Number | Name | Date |
|---|---|---|
| 767,312 | Otis | Aug. 9, 1904 |
| 1,072,282 | Waninger | Sept. 2, 1913 |
| 1,493,145 | Cardullo | May 6, 1924 |
| 1,746,599 | Mahan | Feb. 11, 1930 |

FOREIGN PATENTS

| Number | Country | Date |
|---|---|---|
| 659,940 | France | Feb. 11, 1929 |

Certificate of Correction

May 16, 1950

Patent No. 2,507,555

CHARLES WILLIAM BERTHIEZ

It is hereby certified that errors appear in the printed specification of the above numbered patent requiring correction as follows:

Column 1, line 18, strike out the words "which vary" and insert the same after "differences" in line 21; line 43, for "machine" read *machined work*; line 44, strike out "machined work" and insert therefor *machine*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*